United States Patent
Metois et al.

(10) Patent No.: US 7,925,044 B2
(45) Date of Patent: Apr. 12, 2011

(54) DETECTING ONLINE ABUSE IN IMAGES

(75) Inventors: Eric Metois, Arlington, MA (US); Jack Wolosewicz, San Francisco, CA (US); Mark Shull, Chevy Chase, MD (US)

(73) Assignee: MarkMonitor Inc., Boise, ID (US)

( * ) Notice: Subject to any disclaimer, the term of this patent is extended or adjusted under 35 U.S.C. 154(b) by 899 days.

(21) Appl. No.: 11/670,291

(22) Filed: Feb. 1, 2007

(65) Prior Publication Data
US 2008/0008348 A1    Jan. 10, 2008

Related U.S. Application Data

(60) Provisional application No. 60/764,433, filed on Feb. 1, 2006.

(51) Int. Cl.
*G06K 9/00* (2006.01)

(52) U.S. Cl. .................. 382/100; 382/240

(58) Field of Classification Search ............ 382/100, 382/240; 600/509, 513; 380/28; 713/179
See application file for complete search history.

(56) References Cited

U.S. PATENT DOCUMENTS

| | | |
|---|---|---|
| 2003/0053685 A1 | 3/2003 | Lestideau |
| 2003/0058277 A1 | 3/2003 | Bowman-Amuah |
| 2003/0163724 A1 | 8/2003 | Tayebi et al. |
| 2005/0143136 A1 | 6/2005 | Lev et al. |
| 2005/0257261 A1 | 11/2005 | Shraim et al. |

*Primary Examiner* — Anh Hong Do
(74) *Attorney, Agent, or Firm* — Kilpatrick Townsend & Stockton LLP

(57) ABSTRACT

Tools for analyzing images are disclosed. In some cases, the images are analyzed in order to determine whether a particular web site and/or email message is part of an illegitimate online activity. In an aspect, an image analysis process comprises comparing a suspect image with one or more elements of interest (which can include images, words, etc.) by generating fingerprints characterizing the suspect image and the elements of interest, to allow for a quantitative comparison.

5 Claims, 10 Drawing Sheets

DETECTING ONLINE ABUSE IN IMAGES

CROSS-REFERENCE TO RELATED APPLICATIONS

The present disclosure may be related to the following commonly assigned applications/patents:

This application claims priority under 35 U.S.C. §119(e) from co-pending U.S. Provisional Patent Application No. 60/764,433 filed Feb. 1, 2006 and entitled "Detecting Online Abuse in Images." which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to the field of image analysis in general and in particular to analyzing images for evidence of illegitimate online practices, such as fraud, trademark infringement and others.

BACKGROUND OF THE INVENTION

The growth in the use of the Internet over the past several years has produced a corresponding growth in the number and types of illegitimate practices undertaken over the Internet. From the annoying, but relatively innocuous, invasion of spam email to more insidious practices such as identity theft (including without limitation, phishing, pharming and the like), online fraud, sales of counterfeit and/or unauthorized goods (including via the many reputable online auction sites) trademark misuse, and the like, the Internet has provided numerous opportunities for enterprising fraudsters and con artists to exploit the unwary.

A variety of solutions have been proposed to deal with various types of illegitimate online practices. Merely by way of example, various systems for identifying and responding to online fraud are described in detail in the following commonly-owned, co-pending applications, each of which is hereby incorporated by reference, and which are referred to collectively herein as the "Anti-Fraud Applications": U.S. patent application Ser. No. 10/709,938 (filed by Shraim et al. on May 2, 2004); and U.S. patent application Ser. Nos. 10/996,566, 10/996,567, 10/996,568, 10/996,646, 10/996,990, 10/996,991, 10/996,993, and 10/997,626 (all filed by Shraim, Shull, et al. on Nov. 23, 2004). As another example, systems for identifying, and/or establishing the trustworthiness of, various online entities are described in detail in the following commonly-owned, co-pending applications, each of which is hereby incorporated by reference, and which are referred to collectively herein as the "Trust Applications": U.S. patent application Ser. Nos. 11/368,255, 11/368,329 and 11/368,372 and (all filed on Mar. 2, 2006 by Shull et al.) and U.S. patent application Ser. No. 11/339,985, filed Jan. 25, 2006 by Shull et al.

Such systems often seek to identify illegitimate online practices through the analysis of email messages (including without limitation spam messages and/or phish messages), web sites and other data sources. For instance, the Anti-Fraud Applications describe systems that can analyze text in an email message and/or on a web site, and based at least in part on that analysis, determine whether the email message and/or web site is part of an online scam (e.g., an attempted fraud, identity theft operation, trademark misuse, sale of counterfeit goods, etc.). In an attempt to avoid detection, however, many scammers have begun using images to convey information to targets of their scams.

Merely by way of example, knowing that many email clients and/or servers have spam filters that analyze email text for "toxic" terms (such as common pharmaceuticals, promises of bodily enhancement, etc.), some spammers have begun sending messages that begin with an image (such as a GIF or JPEG image) comprising an advertisement, and include seemingly-innocuous text (such as an apparent message from one friend to another) at the bottom of the message. The email system's spam filter generally is unable to analyze the image, and the text of the message includes nothing that would trigger the spam filter. Consequently, the spam filter allows the message into the user's inbox. When read by the user, however, the message is clearly a spam.

As another example, a seller offering counterfeit products (or genuine products without authorization) often will misuse the logo and/or other trademarks of a reputable brand in order to entice buyers. Such offers are commonplace on a variety of web sites (including in particular auction sites such as eBay®). Often, the misuse of a trademark will occur in an image displayed on the web page. Accordingly, automated tools designed to police trademark infringement and/or counterfeit sales, which generally search for a textual representation of the trademark, brand name, etc., will be unable to detect the misuse.

Optical character recognition ("OCR") tools have been developed to analyze an image for any text contained therein. In many cases, however, those tools require relatively high resolution (e.g., 300 dots per inch ("DPI") or better) images to resolve text in common (e.g., 12 point) font sizes. In online use (such as email and the web), however, much lower resolutions (e.g., 72 DPI) are common. Further, most OCR tools perform optimally only when analyzing high-contrast (e.g., black text on a white background) images. In many cases, however, online are much lower in contrast and/or comprise a variety of colors, rendering useless many OCR tools. In addition, even in situations where an OCR tool might be able to resolve text from an online image, traditional OCR tools are computationally expensive. In a high volume application (such as analyzing email messages and/or web sites in bulk), these tools render unacceptable performance.

Accordingly, there is a need for solutions that allow the analysis of online images (e.g., images in email messages and/or on web pages) to determine whether a particular image is part of an effort to undertake illegitimate online activities.

BRIEF SUMMARY OF THE INVENTION

Embodiments of the invention provide solutions, including without limitation software, methods and systems for analyzing images. In some cases, the images are analyzed in order to determine whether a particular web site and/or email message is part of an illegitimate online activity. Merely by way of example, in a set of embodiments, an image may be analyzed to determine whether the image represents a misuse of a trademark, brand name and/or the like. As another example, a computer system might be configured to monitor an online auction site and analyze images on that site to determine whether any of the auctions on the site represented attempts to sell counterfeit goods and/or otherwise misuse a trademark and/or brand name. In another set of embodiments, an image may be analyzed to determine whether an email message comprising the image is spam and/or is part of a phishing scam. Merely by way of example, an image analysis program may be included in a spam filter on an email system, such that incoming messages are monitored and any images in such messages are analyzed to determine whether the message should be considered legitimate.

In an aspect, the image analysis process performed by some embodiments may comprise comparing a suspect image with one or more elements of interest (which can include images, words, etc.). Some such elements of interest can be considered "toxic" elements, because they represent words, logos, etc. that indicate a relatively high probability that the image is part of illegitimate online activity. By comparing the suspect image with a relatively narrow set of elements of interest (when compared, for example, with a typical OCR process, which needs to perform more generalized text-acquisition functions), embodiments of the invention can exhibit substantially improved performance (at least within the domain of interest) over traditional OCR tools. Accordingly, embodiments of the invention may be configured and/or optimized to analyze the types of images commonly found in email and/or on the web (e.g., relatively low-resolution and/or low-contrast), which have proved to be difficult targets for traditional OCR tools. Further, certain embodiments of the invention may also be able analyze images on a relatively high-volume basis when compared with traditional OCR tools, in part because they can be, in some cases, far cheaper computationally than traditional OCR processes.

Various embodiments of the invention provide, inter alia, methods, systems and software products. In some embodiments of the invention, a system (such as a computer system) might be configured to implement a method of the invention. Merely by way of example, the system might comprise, inter alia, one or more processors, along with instructions (which might be stored on a disk and/or other computer readable medium) executable by the processors to perform the method. In other embodiments, a software product might embody the method, for example as a set of instructions (which again, might be stored on a disk and/or other computer readable medium), which are executable by one or more computers to execute the method. In yet other embodiments, one or more physical and/or tangible signals might be embedded in a carrier wave. The signals might comprise instructions executable by a computer to perform methods of the invention.

Merely by way of example, a method of analyzing an image in accordance with one set of embodiments might comprise maintaining a database comprising representations (i.e., image templates) of a plurality of elements of interest. The method might further comprise segmenting the image into a plurality of blobs. In an aspect of some embodiments, each of the plurality of blobs might be described by a set of characteristics and/or might have a set of boundaries. The method then, might comprise creating, for each of the plurality of blobs, a fingerprint for the blob; this fingerprint might based, at least in part, on the boundaries of the blob.

In some embodiments, the method further comprises collecting, for at least one of the plurality of blobs, a list of one or more candidate elements, based, perhaps, on the characteristics the at least one of the plurality of blobs. These candidate elements can be collected from the database, for example. A score might be assigned to one or more of the candidate elements, based on similarities between a fingerprint of the candidate element and the fingerprint of the at least one of the plurality of blobs. Based at least in part on these scores, it can be determined whether the image is a likely match for one or more of the candidate elements.

Other embodiments provide methods for analyzing web sites and/or for monitoring email messages. Such methods can implement procedures for analyzing images, such as, to list one example, the method described above. An exemplary method for analyzing a web site might comprise downloading a suspect image from a web site, analyzing the suspect image to determine whether the suspect image matches any of the elements of interest, and determining whether the web site is likely to be part of an illegitimate online activity, based at least in part on an analysis of the suspect image. For instance, if the suspect image matches an element of interest, that match might be an indicator that the web site is engaged in an illegitimate activity.

Similarly, an exemplary method of monitoring email messages might comprise receiving an email message, analyzing the email message to identify a suspect image in the email message. This suspect image can be analyzed (perhaps using the method described above) to determine whether the suspect matches any of the elements of interest. The method, then, might include determining whether the email message is likely to be part of an illegitimate online activity, based at least in part upon an analysis of the suspect image.

An exemplary computer system for analyzing an image, in accordance with a set of embodiments, comprises a database configured to store of image templates for a plurality of elements of interest. Each of the image templates might comprise a candidate fingerprint, each of which comprises a plurality of candidate fingerprint signals. The exemplary computer system also comprises a processor in communication with the database and a computer readable medium having embodied thereon a software program executable by the processor.

In a set of embodiments, the software program comprises an image preprocessing and segmentation component configured to receive a suspect image and identify, within the suspect image, a suspect blob having an associated set of suspect blob boundaries. The software program might also comprise a fingerprint generation component configured to create a suspect fingerprint, based at least in part on the suspected blob boundaries. In an aspect, the suspect blob fingerprint comprises a set of suspect blob fingerprint signals.

In certain embodiments, the computer program might also comprise a fingerprint matching component configured to calculate a similarity score for an element of interest. The similarity score similarity score might be based on a plurality of similarity measures between the suspect fingerprint and a candidate fingerprint for the element of interest. Each of the similarity measures might calculated based on a suspect fingerprint signal and a respective candidate fingerprint signal. The fingerprint matching component, then, might be configured to determine, based at least in part on the similarity score, whether the suspect image is a likely match for the element of interest.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
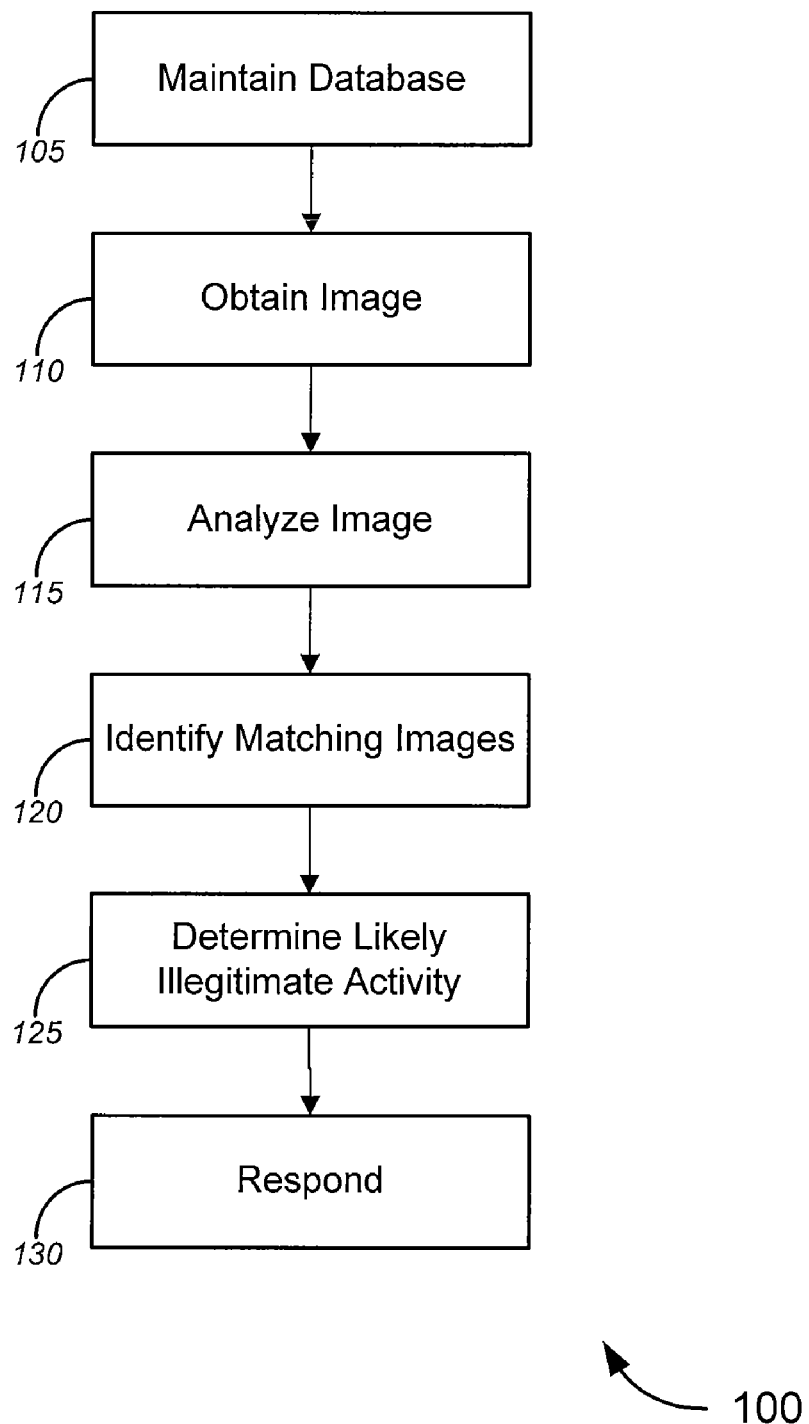
FIG. 1 is a flow diagram illustrating a method of identifying possible online fraud, in accordance with various embodiments of the invention.

In one aspect, the invention provides novel solutions (including without limitation systems, methods and software) for analyzing images. Such solutions can be implemented in a variety of contexts, including without limitation email filters and web site monitors, such as, merely by way of example, the systems described in the Anti-Fraud Applications and the Trust Applications. Merely by way of example, the Anti-Fraud Applications describe systems that can be used, inter alia, to analyze text in email messages and/or web sites to determine whether the messages and/or web sites are part of a phishing scam or other illegitimate online activities. Such systems could additionally and/or alternatively use the image analysis solutions of the present invention to perform such analysis of images in messages and/or web sites.

In a particular aspect, certain embodiments of the invention can be used to monitor online auction sites for instances of fraud, trademark misuse and/or other illegitimate activities. Merely by way of example, a monitoring computer might crawl an auction web site (and/or otherwise download and/or obtain images from the auction web site) and process those images using the image analysis solutions described herein to determine whether any of the auctions may constitute an illegitimate online activity. The system then could be configured to take one or more actions (including without limitation shutting down the auction automatically—if, for example, the system is operated by or on behalf of the proprietor of the auction web site—informing the proprietor of the auction web site of the illegitimate activity, sending a cease and desist letter to the seller of the item at issue, and/or the like).

As described in further detail below, some embodiments of the invention may implement an event manager, such as those described in the Anti-Fraud Applications and/or the Trust Applications. In this way, for example, if there is some question whether an image resembles a toxic element, the event manager may inform an operator of that fact, and the image and one or more candidate images may be presented visually to an operator, so that human judgment can be used to make a final determination. In some cases, a series of candidate elements may be provided, perhaps in prioritized order, based on the automated analysis of the image. In other cases, the image may be provided to a human operator with one or more suspect areas (each of which might be a possible match for one or more candidate elements) highlighted, for example, by overlaying a frame around the suspect area(s) in the image, etc.

Further, an interface (such as a web interface, etc.) may be provided to a customer (who might be an owner of a trademark, etc., a proprietor of an online auction site, etc.) to allow the customer to view results of monitoring and/or analysis operations, and/or to select one or more desired responses. Examples of similar interfaces are described in detail in the Anti-Fraud Applications.

One set of embodiments provides methods for analyzing a web site to determine whether that web site is likely to be engaged in fraud and/or other illegitimate practices, based, in some cases, on an analysis of one or more images served by that web site. Merely by way of example, the Anti-Fraud Applications disclose methods of analyzing a web site (including text on web pages served by that site) to determine whether the site is fraudulent, and one factor in such a determination is whether a site uses trademarks or other words to mislead a user into thinking that the web site is affiliated with a trusted company. For instance, a web page might say "Welcome to Bank X," when in fact the web page is not affiliated with Bank X but instead is an attempt to spoof users into revealing their login credentials for Bank X. An anti-fraud tool might analyze such text in determining whether the web site is likely to be fraudulent. Knowing this, however, many spoof sites have begun to rely on images, rather than text, to imitate trusted web sites. (These images might contain text and/or graphics.) Embodiments of the present invention provide a way to analyze such images, in similar fashion to the way text has been analyzed in the past.

As another example, a site selling counterfeit (and/or unauthorized) goods might employ the logo of a manufacturer of the goods being counterfeited (and/or sold without authorization). Embodiments of the present invention can be used to identify such logos; by correlating the web site against a list of authorized sellers, it can be determined whether or not the web site is selling legitimate goods.

Similarly, another potential use of the image analysis tools provided by the present invention is in the detection and/or investigation of trademark infringement. Merely by way of example, U.S. patent application Ser. No. 09/612,766, entitled "Method and System for Searching and Monitoring Internet Trademark Usage," and filed Jul. 10, 2000 (the entire disclosure of which is hereby incorporated by reference for all purposes, and which is referred to herein as the "Trademark Tracking Application") describes various tools that can be used, inter alia, to search for and/or analyze potential infringing uses of a trademark. Such tools can be enhanced by embodiments of the present invention to facilitate the analysis of non-textual trademarks such as logos and the like.

Another set of embodiments provides more generalized methods of analyzing images. Such methods can be used, for example, to analyze images in electronic mail messages to determine, for instance, whether a particular message might be spam and/or a phishing attempt.

Hence, various embodiments of the invention rely on the analysis of images. Accordingly, FIG. 1 illustrates a method 100 of analyzing an image. This method can be used, inter alia, to determine whether the image is involved in illegitimate activity, such as online fraud, trademark infringement and/or misuse, and the like. The method 100 comprises maintaining a database of elements of interest (block 105).

As used herein the term "element of interest" means an image, or any part thereof, that might be of interest in analyzing suspect images. Merely by way of example, in some cases, an element of interest might be a logo (or portion thereof) that is deemed worthy of protection and/or likely to be used illegitimately (for example, in an online fraud operation). For instance, embodiments of the invention might be operated by a security provider, and a customer of that provider might have one or more corporate logos that the customer wishes to protect from infringement and/or use in online fraud operations. Those logos (and/or portions thereof) therefore might be treated as elements of interest. Other elements of interest might include any images (including images that represent text) that might be useful in determining whether a particular suspect image might be related to an illegitimate online activity, including, without limitation, the names, logos, etc. of various online banks, online auction houses, e-commerce providers and/or any other entities that might be useful for fraudsters to spoof in order to gain illegitimate access to the confidential information of users of those services. It should be noted that not only graphic images can be elements of interest. As explained in more detail below, a string of text (which might be converted into an image) can also serve as an element of interest. In some embodiments, elements of interest are used, as described herein, as templates against which suspect images are compared, to determine whether the suspect image.

The database of elements of interest might comprise, rather than (or in addition to) the images themselves, representations of the images. For example, as described in further detail below, embodiments of the invention are configured to quantify the image along various parameters or dimensions, and these quantified values can be used to create a "fingerprint" of an image. These fingerprints of the elements of interest can be considered templates, against which a quantified representation of a suspect image can be compared, in accordance with various embodiments of the invention.

At block 110, the method 100 comprises obtaining a suspect image. In some cases, a suspect image might be downloaded (and/or referenced by) from a web site suspected of engaging in illegitimate activities. In other cases, a suspect image might be obtained as part of an email message suspected of being spam and/or a phish message. Various fraud-detection systems (such as those disclosed in the Anti-Fraud Applications and/or described with respect to FIG. 8 below) provide a variety of tools, including honeypots, web crawlers, and other tools, which might be the source of images to be analyzed. Any of such tools can be used to obtain suspect images for analysis, and based on the disclosure herein, one skilled in the art can appreciate that there are a wide variety of ways in which a suspect image may be obtained. Hence, many embodiments of the invention do not depend on how the suspect image is obtained.

At block 115, the suspect image is analyzed. Various tools for analyzing an image are possible, and a few such tools are described in detail below. The method, then, might comprise identifying one or more images from the database of elements of interest that match the suspect image (block 120). In other words, it is determined whether the suspect image (or a portion thereof) matches any of the elements of interest stored in the database. One process for making this determination is described in further detail below.

(It is noted that this document occasionally refers to an "image" whether as a suspect image, an element of interest, etc. It should be understood that in referring to an image, this document means an image and/or one or more portions thereof. For example, as described in further detail below, a single image might comprise a plurality of elements that might be analyzed and/or quantified separately. In the simplest case, an image might comprise a corporate logo, as well as a string of text. In certain embodiments, the logo and the text might be considered to be (and/or analyzed as) two separate elements, or effectively, two separate images. Of course, the entire image might simultaneously be considered to be a single element as well.)

Based, at least in part, on whether the image matches any of the candidate elements, it can be determined whether the image is likely to be part of an illegitimate activity, such as possible online fraud, trademark infringement, and/or the like (block 125). In some cases, this might include determining whether a web site associated with the suspect image is part of an illegitimate online activity. In some cases, the analysis of the image, standing alone, might be sufficient to inform this determination. In other cases, additional analysis of the web site, such as that described in the Anti-Fraud Applications, might be used in making such a determination.

If it is determined that the image is likely to be part of an illegitimate activity, an appropriate response might be undertaken (block 130). A variety of responses are possible, including further investigation and/or monitoring of a web site, notifying one or more users (who might be administrators of the system, victims of the illegitimate activity, perpetrators of the illegitimate activity, etc.) about the illegitimate activity and/or the fact that it has been detected, notifying authorities about the illegitimate activity, and/or various technical responses. Merely by way of example, the Anti-Fraud Applications disclose several possible responses to suspected online fraud, and any of those responses can be implemented in conjunction with various embodiments of the invention.

Figure 2:
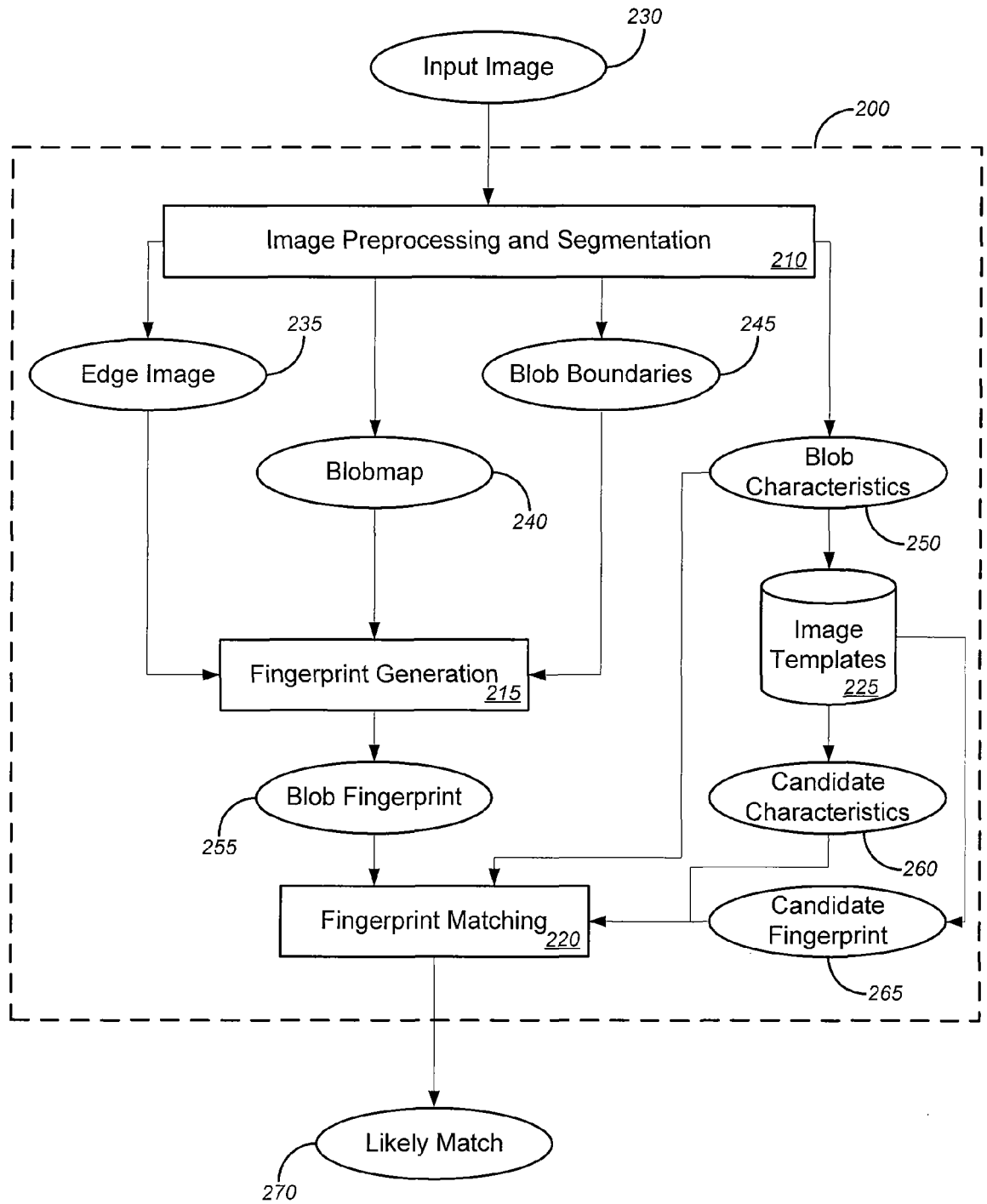
FIG. 2 is a functional block diagram illustrating components of a system for analyzing an image, in accordance with various embodiments of the invention.
Figure 3:
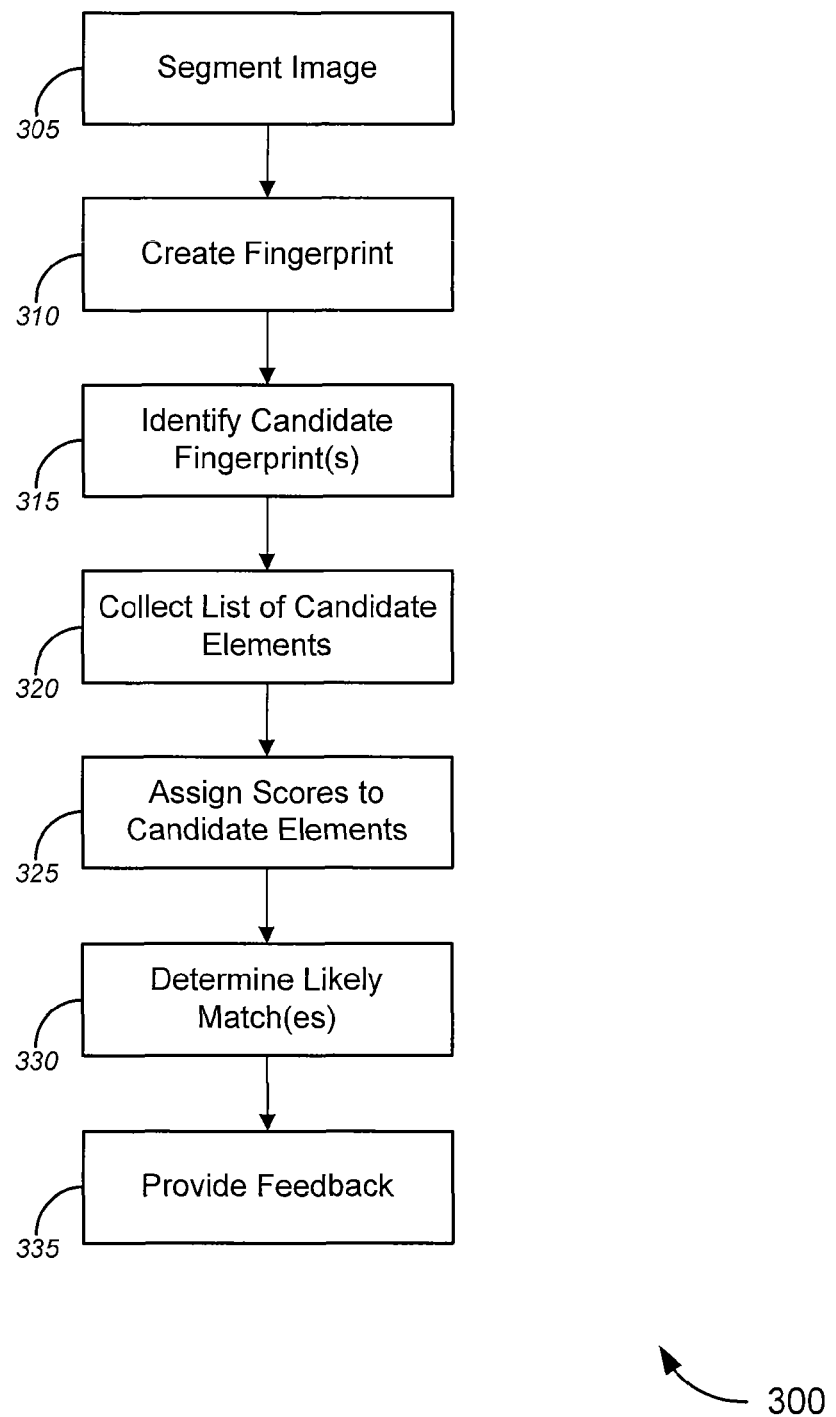
FIG. 3 is a flow diagram illustrating a method of analyzing an image, in accordance with various embodiments of the invention.

FIG. 2 illustrates the functional components of a graphics recognition engine 200 that can be used to analyze an image in accordance with various embodiments of the invention. FIG. 3 depicts an exemplary method 300 that can be undertaken by a system employing the graphics recognition engine 200 of FIG. 2. (It should be noted, however, that such a system might employ methods other than the method 300 of FIG. 3, and that the method 300 might be performed by various systems that do not employ the graphics recognition engine 200 of FIG. 2.) The engine 200 of FIG. 2 comprises an image preprocessing and segmentation component 210, a fingerprint generation component 215, and a fingerprint matching component 220. The engine 200 also includes a database of image templates 225, which is configured to store representations of elements of interest, as mentioned above.

The functionality, in accordance with some embodiments, of the image prepocessing and segmentation component 210, a fingerprint generation component 215, and a fingerprint matching component 220 each will be described in respective detail below, but in a general sense, as noted above, a system employing the graphics recognition engine 200 may be configured to operate in accordance with the method 300 of FIG. 3. When a suspect image 230 is provided as input to the system 200 (for example, after being obtained as described above), the preprocessing and segmentation component 210 segments the image (block 305), for example, by extracting the image's edges 235, a blobmap 240 and a series of blobs, which might be described by their rectangular boundaries 245 and characteristics 250. The fingerprint generation component 215 then generates fingerprints 255 for the blobs (block 310), using the image edges 235, blobmap 240 and blob boundaries 245. Optionally, the blobs' characteristics 250 are then used to identify, from the database of image templates, one or more candidate fingerprints with similar characteristics (block 315) (e.g., similar aspect ratios, similar normalized areas, etc.). By culling the entire database of image templates to a list of candidate images, the cost of the fingerprint matching stage (described below) can be minimized. Accordingly, a list of candidate elements (each corresponding to an identified candidate fingerprint) is collected (block 320).

The blob fingerprints 255 and characteristics 250 are fed into the fingerprint matching component 220, along with the candidate fingerprints 260, and their characteristics 265. The fingerprint matching component 220 then assigns a score to each of the candidate elements (block 325), based on the similarity between the candidate fingerprints 260 and characteristics 265 and the blob fingerprints 250 and characteristics 255. Based on this scoring procedure, one or more candidate elements are determined to be likely matches 270 for the suspect image 230 (block 330).

Optionally, the method 300 might include providing feedback about likely matches (block 335). This can include, merely, by way of example, providing images of the likely matches for a user, providing a list of likely matches (based on element descriptors, described in further detail below, for example). This feedback can be provided in a variety of ways, including without limitation by displaying the feedback on a display, by emailing the feedback, by creating an event in an event manager (described in further detail below) regarding the results of the image analysis, and/or the like.

Figure 4:
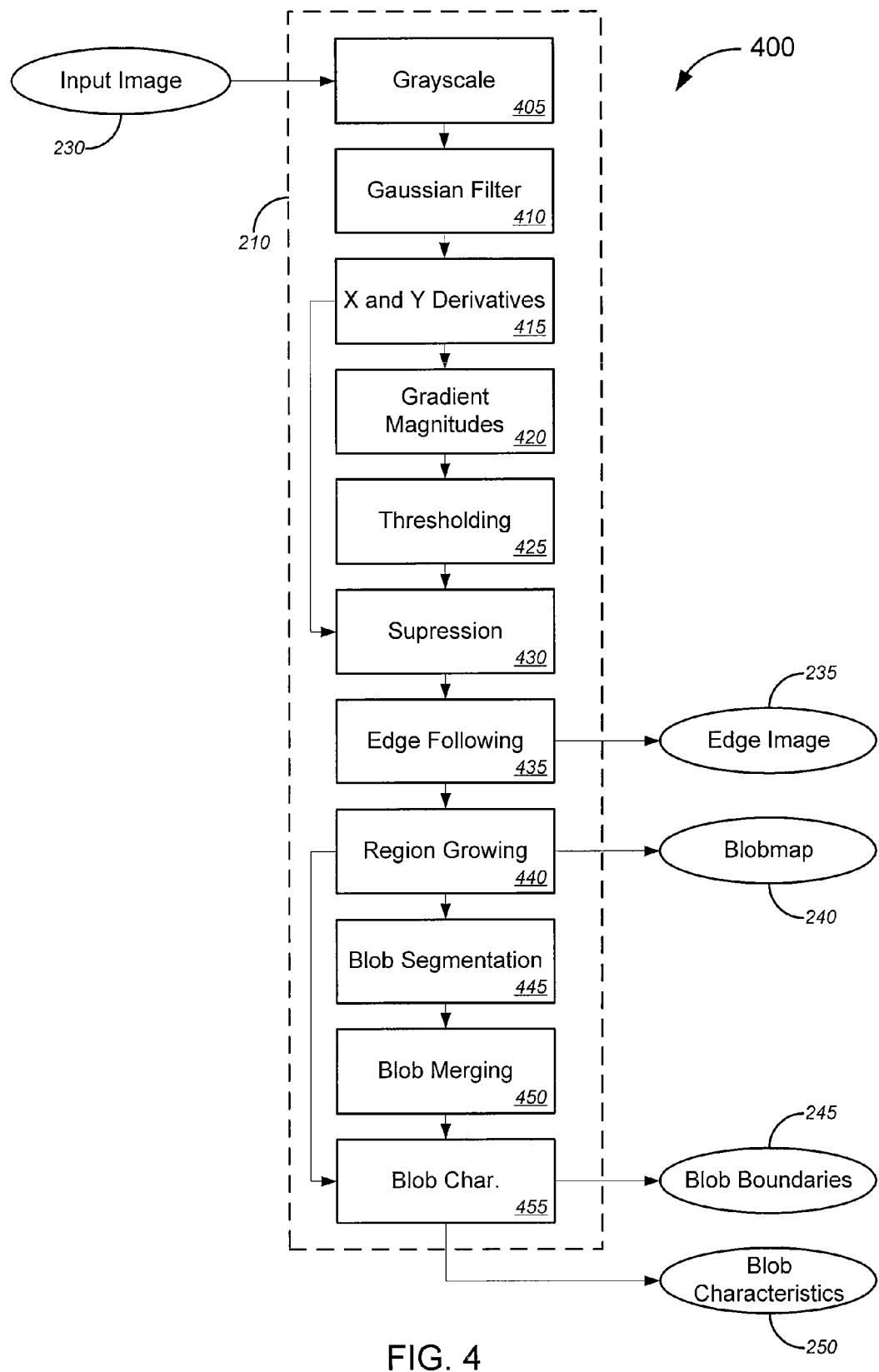
FIG. 4 is functional block diagram illustrating an image preprocessing component of an image analysis system, in accordance with various embodiments of the invention.
Figure 5:
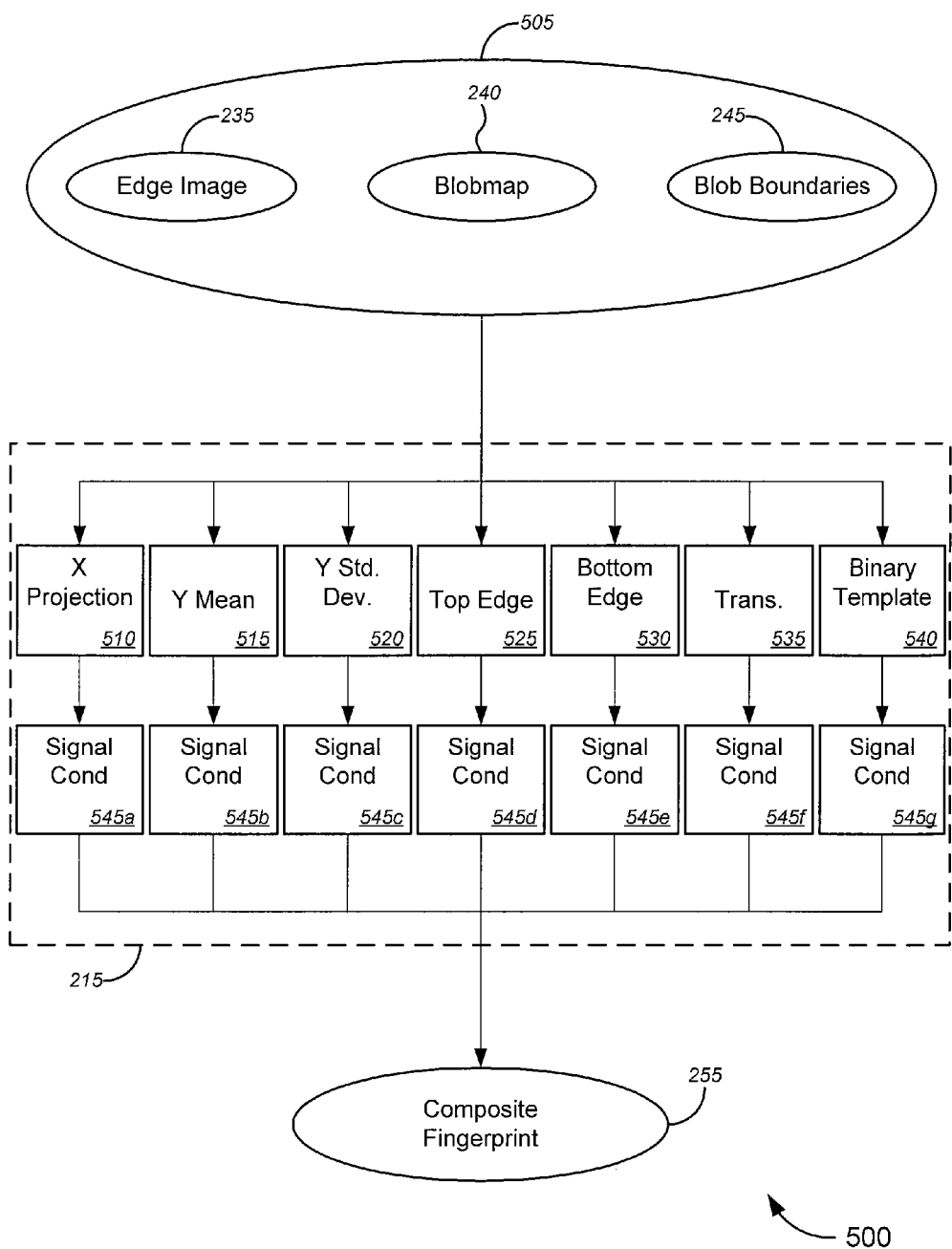
FIG. 5 is functional block diagram illustrating an image fingerprinting component of an image analysis system, in accordance with various embodiments of the invention.
Figure 6:
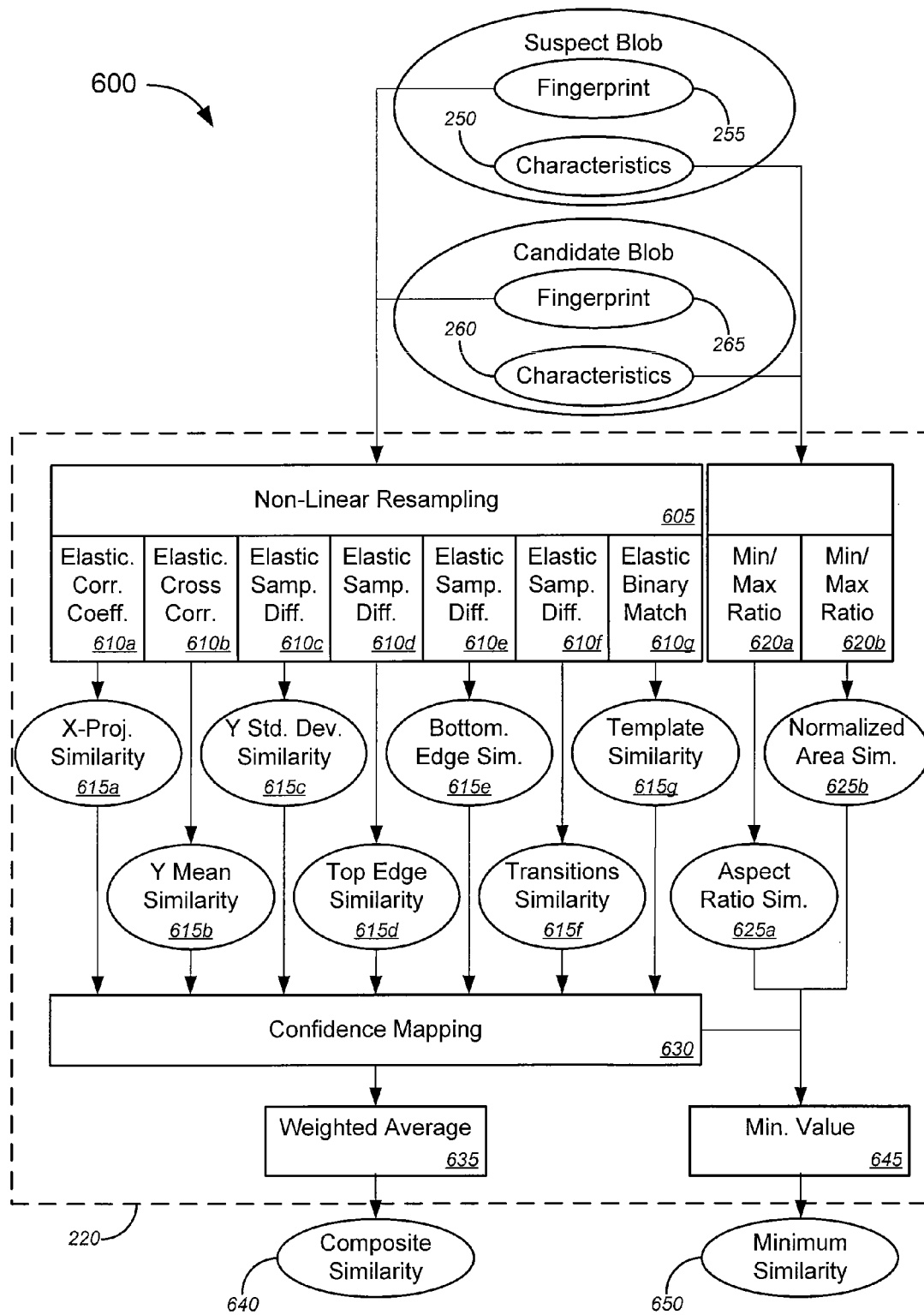
FIG. 6 is a functional block diagram illustrating a fingerprint matching component of an image analysis system, in accordance with various embodiments of the invention.

FIGS. 4-6 provide more detailed illustrations of the procedures carried out by the major components of the graphics recognition engine 200, in accordance with various embodiments of the invention. For instance, FIG. 4 provides a more detailed illustration of the operation 400 of the image preprocessing and segmentation component 210 described more generally above. As a general matter, the image preprocessing and segmentation component 210 extracts the image's edges, as well as a blobmap and a series of "blobs" within the image. As used herein, the term "blob" refers to any discrete portion of an image that can be thought of as a subimage (or an image within the image). Examples of blobs might be text strings (e.g., words, phrases, etc.), logos, particular image elements (such as the subjects of a photograph, etc.) and/or any other portion of an image that can be identified using various procedures of the invention. In a set of embodiments, a blob can be described by its boundaries (and, in particular embodiments, a set of rectangular boundaries) and its characteristics, as described in more detail below.

In a set of embodiments, upon receiving an input image 230, the image segmentation and preprocessing component 210 converts the image to a grayscale (block 405), which can facilitate image matching by removing chromatic details which generally are unnecessary to determining image similarity. The converted image is then passed through a filter stage (block 410), which can serve to reduce the effect of noise during gradient estimation (discussed below) and thereby provide greater accuracy in locating edge images. In some embodiments, the filter stage employs a Gaussian low pass filter. At this point, X (horizontal) and Y (vertical) tonal derivatives (i.e. derivatives that measure tonal changes along the X and Y axes, respectively) are computed (block 415), which allows the image segmentation and preprocessing component 210 to determine a measure of the tonal gradient magnitudes (block 420). These gradients effectively reveal sharp transitions in the image. A thresholding algorithm (block 425) and non-maximal suppression (block 430) are applied to allow further definition of edge boundaries, based on the gradient magnitudes.

At this point, an edge following algorithm is applied to the enhanced image (block 435) to find the edge images 235 for shapes or regions within the image. A region growing stage (block 440) is then used expand the edge image in order to join pixels that should belong to the same blob. This process produces a blobmap 240 of all of the identified blobs in the image, and their respective positions. In an aspect of some embodiments, blocks 410-435 can be considered components of an edge detector.

This blobmap 240 is provided to a blob segmentation function (block 445) is used to differentiate between various blobs that have been identified. The blob segmentation function, in an embodiment, is a recursive search similar to a flood fill algorithm familiar to those skilled in the art. The blob segmentation function provides a series of boundaries (which, again, are rectangular boundaries in an aspect of some embodiments) for the blobs identified in the image. It should be noted that some of the blob boundaries might be overlapping. Hence, in some cases, a blob merging function (block 450) can be used to merge blobs that are in close proximity and/or overlap (basically, to account for the fact that two—or more—identified blobs might in reality be parts of a single blob). It should be noted, at this point, that blobs need not be mutually exclusive. Merely by way of example, in some cases, an image might comprise three blobs—Blob A, Blob B, and Blob C, which is the union of Blob A and Blob B.

A blob characterization function (block 455) then computes outputs the identified boundaries 245 of the various identified blobs (as described above, for example), as well as the blob characteristics 250. In a set of embodiments, the blob characteristics 250 might comprise a plurality of measures. Two exemplary measures are the aspect ratio of the blob, which is basically the X/Y ratio of the blob's rectangular boundaries (i.e., the ratio of the width of the blob to the height of the blob), and the normalized area of the blob, which is a scale-independent measure of the blob's area. (As noted below, various embodiments employ normalization of dimensions to account for the fact that the same image might be scaled differently in various permutations.) The normalized area might be derived from the number of pixels that constitute blob and/or the dimensions of the blob's rectangular boundaries.

As noted above with respect to FIG. 2, once a suspect image 230 has been preprocessed, the fingerprinting component 215 can be used to generate fingerprints for each of the blobs contained in a suspect image. FIG. 5 provides an illustration 500 of the functionality of the fingerprinting component 215, in accordance with one set of embodiments. As input, the fingerprinting stage accepts a set of attributes for a blob 505, which might comprise a set of edge images 235 for the blob, a blobmap 240, and/or a set of blob boundaries 245, which can be generated, for example, as described above.

Based on these blob attributes, the fingerprinting stage 215 calculates a number of descriptive features that can be used to characterize the blob. (These descriptive features are referred to herein as "fingerprint signals."). These fingerprint signals, in most cases, can be calculated based on the blob edge images, characteristics and/or boundaries, as well as, in some cases, the blobmap itself. Examples of fingerprint signals that can be calculated for a blob, in accordance with various embodiments, include, without limitation an X-projection value 510 (i.e., the projection of the blob along a horizontal axis or the width of the blob), a Mean Y value 515 (i.e. the center height of the blob along the horizontal axis), a standard deviation for the Y values 520 (i.e., the blob's vertical spread around its center height along the horizontal axis), a top edge value 525 (i.e., the top-most edge of the blob along the horizontal axis), a bottom edge value 530 (i.e., the bottom-most edge of the blob along the horizontal axis), a transition value 535 (i.e. the number of occurrences of vertical transitions, or height differences, along the horizontal axis of the blob). In some embodiments, a binary template 525 of the edges that define the blob is another possible fingerprint signal. Basically, the binary template is a digitized representation of the outline of the blob itself. In a particular embodiment, for example, a blob's binary template is a relatively low-resolution bitmap of the blob's edges (e.g., at a color depth of 1 bit, with a height of 8 pixels, and a variable width, to name one example).

Some or all of these calculated values might be subjected to signal conditioning 545 to further refine the calculated values. It should be noted that different types of signal conditioning 545 might be applied, depending on the type of value. Merely by way of example, the chart below describes some exemplary signal conditioning processes that may be applied to each of the fingerprint signals described above.

| Fingerprint Signal | Signal Conditioning Operations |
|---|---|
| X projection | Normalization; Low pass filter; 8-bit quantization |
| Y mean | Normalization; Low pass filter; 8-bit quantization |
| Y std. deviation | Normalization; Low pass filter; 8-bit quantization |
| Top Edge | Shift by Y mean; Normalization; Low pass filter; 8-bit quantization |
| Bottom Edge | Shift by Y mean; Normalization; Low pass filter; 8-bit quantization |
| Transitions | Low pass filter; 8-bit quantization |
| Binary template | 8-bit mask spanning top to bottom edges |

One skilled in the art will appreciate, based on the disclosure herein, that there are a variety of different types of signal conditioning available, and that the operations described above (like the types of fingerprint signals themselves) are merely exemplary in natures. As a general matter, however, certain types of signal conditioning will be applied. Merely by way of example, for calculating dimensions (such as the X projection, Y mean and the like), some sort of normalization generally will be applied, to account for the fact that suspect images might be scaled differently (i.e., larger or smaller) than the candidate images to which they are being compared. The low pass filter serves to reduce the effects of noise in the fingerprint signals and or the effects of local scale variation. The 8-bit quantization can be used to reduce memory and/or processing overhead, which can allow for more efficient processing and/or storage of fingerprints. Based on the disclosure herein, one skilled in the art will appreciate that a variety of signal conditioning operations may be used, and those conditions described herein are merely exemplary in nature. These (perhaps conditioned) values 515-540 are then accumulated into a composite fingerprint 255 for the blob 505.

The process described above for generating a fingerprint can be iterated as necessary for each blob in an image. A similar procedure can be used for generating fingerprints of images of interest (i.e., candidate image templates). In an aspect of some embodiments, each candidate blob is considered individually, without regarding to other blobs that might be present in an image of interest. Conversely, in some embodiments, multiple candidate blobs in a particular image of interest might be considered collectively.

Once a fingerprint has been generated for a blob in a suspect image, that fingerprint can be compared with other blob fingerprints, as mentioned briefly above. (This process, as well, can be repeated for each blob in a suspect image.) Specifically, in a set of embodiments, each blob fingerprint from a suspect image is compared against some or all of the image templates in the database to determine whether the blob is a likely match for any of the image templates.

Hence, FIG. 6 provides a detailed illustration 600 of the operation of one set of embodiments of the fingerprint matching stage 220 of the graphics recognition engine 200, which can be used to perform fingerprint comparisons. The fingerprint matching stage 220 takes as input a blob descriptor, comprising a set of blob characteristics 250 and a blob fingerprint 255 (which might comprise a set of fingerprint signals, as described above, for example) for a suspect blob, as well as a blob descriptor, again comprising a set of characteristics 260 and fingerprint 260, for a candidate blob (the blob descriptor for the candidate blob might be incorporated within an image template for a candidate image). The generation of the suspect blob characteristics 250 is described above with respect to FIG. 4, while the generation of the suspect blob fingerprint 255 is described above with respect to FIG. 5. As noted above, similar processes can be used to generate the components of the candidate template, including the characteristics 260 and fingerprint 265 of the candidate blob. Candidate templates are stored in a database of image templates 225, perhaps using a process described in further detail below with respect to FIG. 7.

The fingerprint 255 of the suspect blob, as well as the fingerprint 265 of the candidate blob are provided to a sampling function 605, which, in some cases, is a non-linear resampling function. One skilled in the art will appreciate, based on the disclosure herein, that a non-linear resampling mode can be used to infer the proper amount of resampling required. In many cases, resampling is helpful, because it can be used to account for warping and other scale deviations, such as those that can result from the use of different (but perhaps similar fonts). The sampling function 605 operates on the respective characteristics fingerprint signals of the suspect blob and the candidate blob. The sampling function 605 effectively aligns the features of the two blobs being compared. One way of achieving this is for the sampling function 605 to align one or more anchor points in the transition fingerprint signals of the respective blobs, perhaps using local correlation coefficient measures. Once the blobs have been aligned, the resampling module 605 can create piece-wise linear resampling scales for each of the two blobs. Hence, in a particular set of embodiments, a set of resampling scales can be inferred, and those scales can be used to calculate similarity measures 615 for a number of different fingerprint signals, as described further below.

Merely by way of example, the correlation coefficient 610*a* between the respective X projection signals of the suspect blob and the candidate blob can be used to calculate a similarity measure 615*a* for the X projection signals. As another example, a cross correlation 610*b* between the respective Y mean signals for each blob can be used to derive a similarity measure 615*b* for the Y mean signals. The similarity measures for the X projection and Y mean both can benefit through the use of the inferred non-linear resampling scales.

Out-of-sample differences for Y standard deviation 610*c*, top edge 610*d* and bottom edge 610 can be used to derive similarity measures (615*c*, 615*d* and 615*e*, respectively) for these fingerprint signals. The derivation of these measures 615*c*-*e* can employ both non-linear resampling and normalization, to account for, inter alia, scale differences between the blobs being compared. Somewhat similarly, out-of-sample differences 610f can be used to derive a similarity measure 615f for the transition signals. In an embodiment, the scaling of the out-of-sample differences is relative to the transition signals themselves, since (unlike some of the other fingerprint signals), the transition signals convey morphological information (e.g., image edge counts) that do not scale with the blob's size. Hence, when comparing two aligned sample values from two transition signals, the system can take into account the number of edges that are expected locally and scale the sample difference accordingly.

The binary templates 610g of the respective blobs can also be compared. Merely by way of example, after non-linear resampling (using the inferred resampling scales noted above), the respective binary templates of the respective blobs can be compared bit-for-bit, leading to an "out-of-bit" error rate, which can be used to generate a template similarity measure 615g.

These derived similarity measures 615 can be provided as input to a confidence mapping function 630. The confidence mapping function 630 scores the similarity measures 615 according to a weighing system to come up with a weighted average 635 of the similarity measures, from which a composite similarity score 640 can be derived. The relative weighting to give to each of the similarity measures is discretionary, and in many cases, it will be determined experimentally (e.g., by iteratively performing a human comparison of two images or blobs, and then generating a composite similarity score using different weightings, and then by selecting the weighting that produces composite similarity scores, across a number of image comparisons, closest to the human determination). Merely by way of example, the table below lists the composite weight assigned to each similarity measure in accordance with one embodiment of the invention.

| Similarity Measure | Composite Weight |
| --- | --- |
| Aspect ratio | 0.0 |
| Normalized area | 0.0 |
| X projection | 0.06 |
| Y mean | 0.06 |
| Y std. deviation | 0.12 |
| Transitions | 0.18 |
| Top Edge | 0.18 |
| Bottom Edge | 0.18 |
| Binary Template | 0.24 |

Hence, in a set of embodiments, the similarity measure for a particular fingerprint signal is multiplied by its composite weight, and the sum of each of these products is used as the composite similarity score 640. (In a set of embodiments, the similarity measures for each fingerprint signal are normalized by design, such that each can be compared individually, as mentioned below, and so that the composite weights assigned represent an absolute weighting that is not affected by disparate scaling among different similarity measures.)

Further, in some embodiments, the fingerprint comparison stage calculates similarity measures for the aspect ratio of each blob and the normalized area of each blob, based on the respective characteristics 250, 260 of the suspect blob and the candidate blob. In both cases, the similarity measure is calculated from the ratio of the minimum value over the maximum value. Hence, for each blob (the suspect and the candidate) a minimum/maximum aspect ratio 620e is calculated, and a minimum/maximum normalized area ratio 620b is calculated. From these values, respectively, a similarity measure can be determined for both the aspect ratio 625a and the normalized area 625b. Merely by way of example, the similarity measure 625a for the aspect ratio ("AR") might be calculated thus:

$$Similarity_{AR} = \frac{\text{Min}(AR_{SUSPECT}, AR_{CANDIDATE})}{\text{Max}(AR_{SUSPECT}, AR_{CANDIDATE})}$$

while the similarity measure 625b for the normalized area ("NA") might be calculated likewise:

$$Similarity_{NA} = \frac{\text{Min}(NA_{SUSPECT}, NA_{CANDIDATE})}{\text{Max}(NA_{SUSPECT}, NA_{CANDIDATE})}$$

In an aspect, each of these similarity measures 625 will produce a number between 0.0 and 1.0, where 1.0 indicates identity between the suspect blob and the candidate blob.

It should be noted that, while the illustrated embodiment does not consider the similarity scores for the aspect ratio signal 625a or the normalized area signal 625b in calculating the composite similarity score 640, in other embodiments, one or both of those scores might be considered. Similarly, in other embodiments, one or more of the similarity scores 615 for the other signals might be ignored, and/or other similarity scores not discussed herein might be used.

In a set of embodiments, in addition to considering the composite similarity score 640, the fingerprint matching component 220 will also consider some or all of the similarity measures 615, 625 individually. Specifically, a minimum value 645 from all of the similarity scores is used to determine an overall minimum individual similarity score 650.

Then, in a set of embodiments, the composite similarity score 640 and/or the minimum individual similarity score 650 are compared with a threshold to determine whether the suspect image is a likely match with any of the candidate images. In a particular set of embodiments, both the composite similarity score 640 and the minimum individual similarity score 650 must each exceed a specified threshold (there may be different thresholds for each similarity score), or the candidate image that is the subject of the comparison will be discarded. Further, in some embodiments, when determining a best match for a suspect blob from among a plurality of candidates that exceed the minimum threshold, the candidate image with the highest composite similarity score 640 can be considered the best match.

Figure 7:
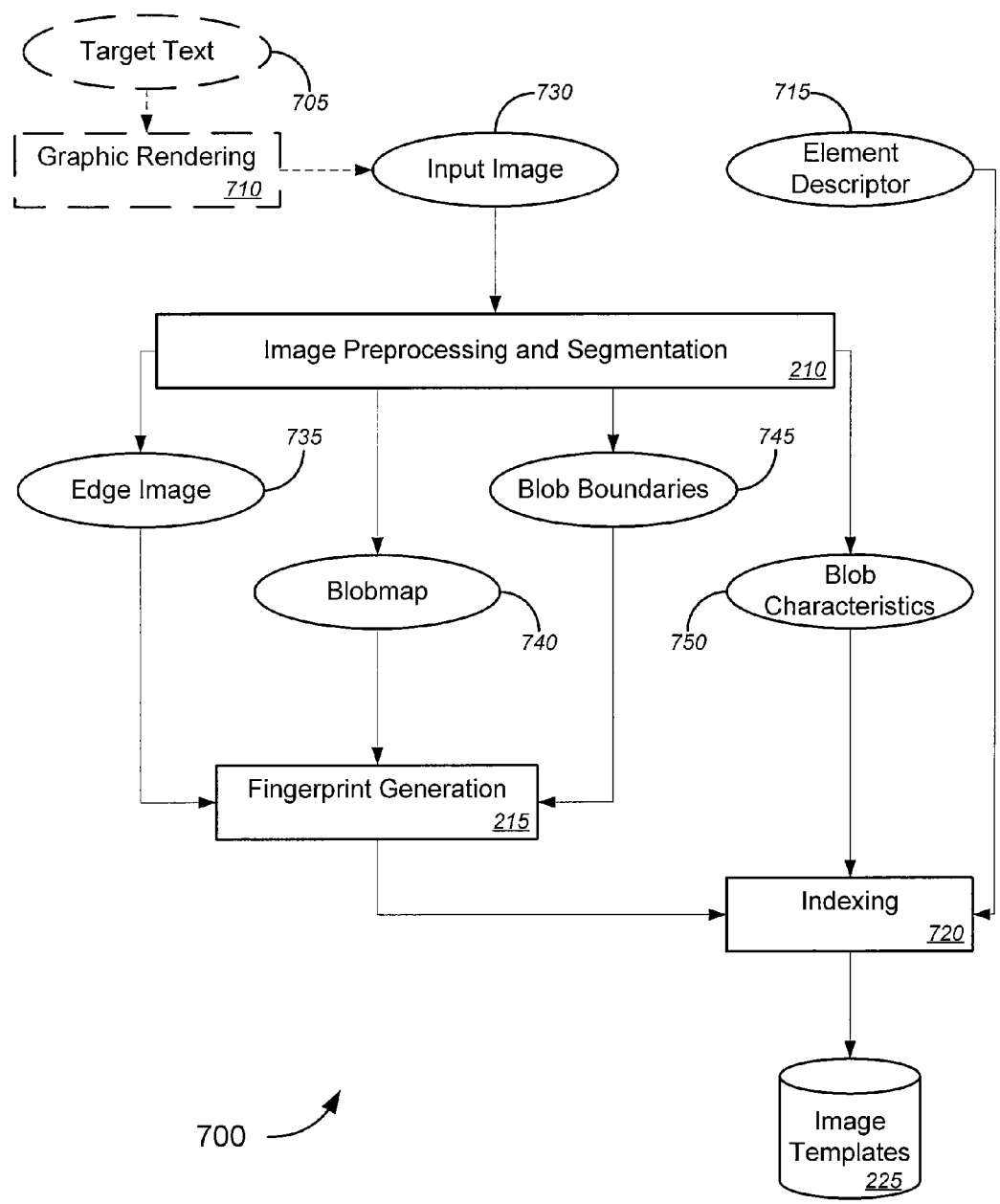
FIG. 7 is a functional block diagram illustrating a system for creating candidate image templates, in accordance with various embodiments of the invention.

FIG. 7 illustrates a process 700 for adding candidate images to an image template database 225. The process 700 employs many components and procedures that are similar and/or identical to those described above. The input image 730 (i.e., an image to which suspect images are to be compared is provided as input to the processing and segmentation component 210, and a set of edge images 735, a blobmap 740n and a set of blob characteristics 750 are generated and provided to the fingerprint generation component 215, in similar fashion to that described above with respect to FIG. 2. (In some cases, the target might actually be a set of target text 705, which can first be passed through a graphic rendering component 710, which converts the target text 705 to an image 730, using any of a variety of processes well known in the art.)

The image preprocessing and segmentation stage 210 also produces a set of blob characteristics 750, again in a manner similar to that described above. The fingerprints for each of the blobs, along with their associated characteristics 750, together with an optional element descriptor 715, which can be used to provide a descriptive label for the blob and/or image (such as "Bank X logo," etc.), make up the image template for an element of interest A plurality of such image templates can be indexed (block 720) and then stored in the image template database 225, using any of a variety of well-known database storage techniques.

As noted above, the graphics recognition engine 200 can be implemented within a variety of computer systems. Merely by way of example, a fraud monitoring system such as the system 800 of FIG. 8 can employ the graphics recognition engine 200, either as a standalone component, or as an integrated component within another element of the system, as well as various methods of the invention, to help identify, monitor, and/or remedy illegitimate online activities, for example as described above. (Various other systems described in the Anti-Fraud Applications, the Trust Applications and the Trademark Tracking Application can also implement the graphics recognition engine 200 and/or various methods of the present invention.) Merely by way of example, the graphics recognition engine 200 (and/or any of its components) can provide an application programming interface ("API") that can be called or otherwise implemented by other system components. Alternatively and/or additionally, the graphics recognition engine 200 can be implemented as a standalone application, a COM object, a dynamic link library and/or the like for analyzing images in a variety of contexts.

Figure 8:
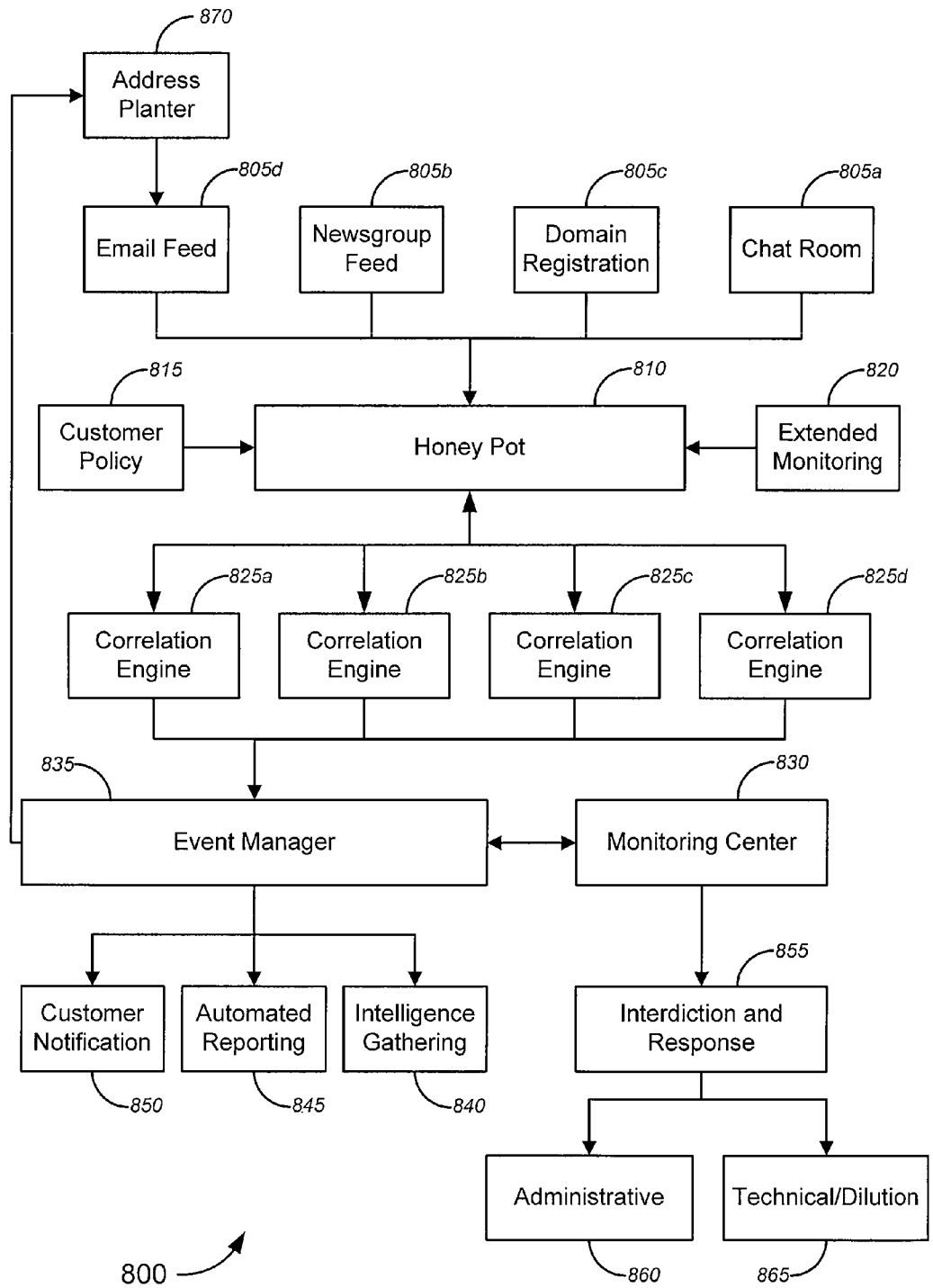
FIG. 8 is a functional block diagram illustrating a system for dealing with online fraud, in accordance with various embodiments of the invention.

Hence, FIG. 8 illustrates the functional elements of an exemplary system 800 that can be used to combat online fraud in accordance with some of these embodiments and provides a general overview of how certain embodiments can operate. It should be noted that the functional architecture depicted by FIG. 8 and the procedures described with respect to each functional component are provided for purposes of illustration only, and that embodiments of the invention are not necessarily limited to a particular functional or structural architecture; the various procedures discussed herein may be performed in any suitable framework.

In many cases, the system 800 of FIG. 8 may be operated by a fraud prevention service, security service, etc. (referred to herein as a "fraud prevention provider") for one or more customers. Often, the customers will be entities with products, brands and/or web sites that risk being imitated, counterfeited and/or spoofed, such as online merchants, financial institutions, businesses, etc. In other cases, however, the fraud prevention provider may be an employee of the customer an/or an entity affiliated with and/or incorporated within the customer, such as the customer's security department, information services department, etc.

In accordance with some embodiments, of the invention, the system 800 can include (and/or have access to) a variety of data sources 805. Although the data sources 805 are depicted, for ease of illustration, as part of system 800, those skilled in the art will appreciate, based on the disclosure herein, that the data sources 805 often are maintained independently by third parties and/or may be accessed by the system 800. In some cases, certain of the data sources 805 may be mirrored and/or copied locally (as appropriate), e.g., for easier access by the system 800.

The data sources 805 can comprise any source from which data about a possible online fraud may be obtained, including, without limitation, one or more chat rooms 805*a*, newsgroup feeds 805*b*, domain registration files 805*c*, and/or email feeds 805*d*. The system 800 can use information obtained from any of the data sources 805 to detect an instance of online fraud and/or to enhance the efficiency and/or effectiveness of the fraud prevention methodology discussed herein. In some cases, the system 800 (and/or components thereof) can be configured to "crawl" (e.g., to automatically access and/or download information from) various of the data sources 805 to find pertinent information, perhaps on a scheduled basis (e.g., once every 80 minutes, once per day, once per week, etc.).

Merely by way of example, there are several newsgroups commonly used to discuss new spamming/spoofing schemes, as well as to trade lists of harvested email addresses. There are also anti-abuse newsgroups that track such schemes. The system 800 may be configured to crawl any applicable newsgroup(s) 805*b* to find information about new spoof scams, new lists of harvested addresses, new sources for harvested addresses, etc. In some cases, the system 800 may be configured to search for specified keywords (such as "phish," "spoof," etc.) in such crawling. In other cases, newsgroups may be scanned for URLs, which may be download (or copied) and subjected to further analysis, for instance, as described in detail below. In addition, as noted above, there may be one or more anti-abuse groups that can be monitored. Such anti-abuse newsgroups often list new scams that have been discovered and/or provide URLs for such scams. Thus, such anti-abuse groups may be monitored/crawled, e.g., in the way described above, to find relevant information, which may then be subjected to further analysis. Any other data source (including, for example, web pages and/or entire web sites, email messages, etc.) may be crawled and/or searched in a similar manner.

As another example, online chat rooms (including without limitation, Internet Relay Chat ("IRC") channels, chat rooms maintained/hosted by various ISPs, such as Yahoo™, America Online™, etc., and/or the like) (e.g., 805*a*) may be monitored (and/or logs from such chat rooms may be crawled) for pertinent information. In some cases, an automated process (known in the art as a "bot") may be used for this purpose. In other cases, however, a human attendant may monitor such chat rooms personally. Those skilled in the art will appreciate that often such chat rooms require participation to maintain access privileges. In some cases, therefore, either a bot or a human attendant may post entries to such chat rooms in order to be seen as a contributor.

Domain registration zone files 805*c* (and/or any other sources of domain and/or network information, such as Internet registry e.g., ARIN) may also be used as data sources. As those skilled in the art will appreciate, zone files are updated periodically (e.g., hourly or daily) to reflect new domain registrations. These files may be crawled/scanned periodically to look for new domain registrations. In particular embodiments, a zone file 805*c* may be scanned for registrations similar to a customer's name and/or domain. Merely by way of example, the system 800 can be configured to search for similar domains registration with a different top level domain ("TLD") or global top level domain ("gTLD"), and/or a domains with similar spellings. Thus, if a customer uses the <acmeproducts.com> domain, the registration of <acme-products.biz>, <acmeproducts.co.uk>, and/or <acmeproduct.com> might be of interest as potential hosts for spoof sites, and domain registrations for such domains could be downloaded and/or noted, for further analysis of the domains to which the registrations correspond. In some embodiments, if a suspicious domain is found, that domain may be placed on a monitoring list. Domains on the monitoring list may be monitored periodically, as described in further detail below, to determine whether the domain has become "live" (e.g., whether there is an accessible web page associated with the domain).

One or more email feeds 805*d* can provide additional data sources for the system 800. An email feed can be any source of email messages, including spam messages, as described above. (Indeed, a single incoming email message may be considered an email feed in accordance with some embodiments.) In some cases, for instance as described in more detail below, bait email addresses may be "seeded" or planted by embodiments of the invention, and/or these planted addresses can provide a source of email (i.e., an email feed). The system 800, therefore, can include an address planter 870, which can be used to plant email addresses as bait for phishing attacks, which can provide one type of email feed.

Other email feeds can include (but are not limited to), messages received directly from spammers/phishers; email forwarded from users, ISPs and/or any other source (based, perhaps, on a suspicion that the email is a spam and/or phish); email forwarded from mailing lists (including without limitation anti-abuse mailing lists), etc. When an email message (which might be a spam message) is received by the system 800, that message can be analyzed to determine whether it is part of a phishing/spoofing scheme. The analysis of information received from any of these data feeds is described in further detail below, and it often includes an evaluation of whether a web site (often referenced by a URL or other information received/downloaded from a data source 805) is likely to be engaged in a phishing and/or spoofing scam.

Any email message incoming to the system can be analyzed according to various methods of the invention, including without limitation the analysis of any images contained in the email message, using the graphics recognition engine (and/or associated methods) described above, for example. As those skilled in the art will appreciate, there is a vast quantity of unsolicited email traffic on the Internet, and many of those messages may be of interest in the online fraud context. Merely by way of example, some email messages may be transmitted as part of a phishing scam, described in more detail herein. Other messages may solicit customers for black- and/or grey-market goods, such as pirated software, counterfeit designer items (including without limitation watches, handbags, etc.). Still other messages may be advertisements for legitimate goods, but may comprise unlawful or otherwise forbidden (e.g., by contract) practices, such as improper trademark use and/or infringement, deliberate under-pricing of goods, etc. Various embodiments of the invention can be configured to search for, identify and/or respond to one or more of these practices, as detailed below. (It should be noted as well that certain embodiments may be configured to access, monitor, crawl, etc. data sources-including zone files, web sites, chat rooms, etc.—other than email feeds for similar conduct). Merely by way of example, the system 800 could be configured to scan one or more data sources for the term ROLEX™, and/or identify any improper advertisements for ROLEX™ watches. Similarly, the system 800 could be configured to analyze images in one or more data sources for similarity to the ROLEX™ logo.

Those skilled in the art will further appreciate that an average email address will receive many unsolicited email messages, and the system 800 may be configured, as described below, to receive and/or analyze such messages. Incoming messages may be received in many ways. Merely by way of example, some messages might be received "randomly," in that no action is taken to prompt the messages. Alternatively, one or more users may forward such messages to the system. Merely by way of example, an ISP might instruct its users to forward all unsolicited messages to a particular address, which could be monitored by the system 800, as described below, or might automatically forward copies of users' incoming messages to such an address. In particular embodiments, an ISP might forward suspicious messages transmitted to its users (and/or parts of such suspicious messages, including, for example, any URLs included in such messages) to the system 800 (and/or any appropriate component thereof) on a periodic basis. In some cases, the ISP might have a filtering system designed to facilitate this process, and/or certain features of the system 800 might be implemented (and/or duplicated) within the ISP's system.

As described above, the system 800 can also plant or "seed" bait email addresses (and/or other bait information) in certain of the data sources, e.g. for harvesting by spammers/phishers. In general, these bait email addresses are designed to offer an attractive target to a harvester of email addresses, and the bait email addresses usually (but not always) will be generated specifically for the purpose of attracting phishers and therefore will not be used for normal email correspondence.

The system 800 can further include a "honey pot" 810. The honey pot 810 can be used to receive information from each of the data sources 805 and/or to correlate that information for further analysis if needed. The honey pot 810 can receive such information in a variety of ways, according to various embodiments of the invention, and how the honey pot 810 receives the information is discretionary.

Merely by way of example, the honey pot 800 may, but need not, be used to do the actual crawling/monitoring of the data sources, as described above. (In some cases, one or more other computers/programs may be used to do the actual crawling/monitoring operations and/or may transmit to the honey pot 810 any relevant information obtained through such operations. For instance, a process might be configured to monitor zone files and transmit to the honey pot 810 for analysis any new, lapsed and/or otherwise modified domain registrations. Alternatively, a zone file can be fed as input to the honey pot 810, and/or the honey pot 810 can be used to search for any modified domain registrations.) The honey pot 810 may also be configured to receive email messages (which might be forwarded from another recipient) and/or to monitor one or more bait email addresses for incoming email. In particular embodiments, the system 800 may be configured such that the honey pot 810 is the mail server for one or more email addresses (which may be bait addresses), so that all mail addressed to such addresses is sent directly to the honey pot 810. The honey pot 810, therefore, can comprise a device and/or software that functions to receive email messages (such as an SMTP server, etc.) and/or retrieve email messages (such as a POP3 and/or IMAP client, etc.) addressed to the bait email addresses. Such devices and software are well-known in the art and need not be discussed in detail herein. In accordance with various embodiments, the honey pot 810 can be configured to receive any (or all) of a variety of well-known message formats, including SMTP, MIME, HTML, RTF, SMS and/or the like. The honey pot 810 may also comprise one or more databases (and/or other data structures), which can be used to hold/categorize information obtained from email messages and other data (such as zone files, etc.), as well as from crawling/monitoring operations.

In some aspects, the honey pot 810 might be configured to do some preliminary categorization and/or filtration of received data (including without limitation received email messages). In particular embodiments, for example, the honey pot 810 can be configured to search received data for "blacklisted" words or phrases and/or images. (The concept of a "blacklist" is described in further detail in the Anti-Fraud Applications). The honey pot 810 can segregate data/messages containing such blacklisted terms for prioritized processing, etc. and/or filter data/messages based on these or other criteria.

The honey pot 810 also may be configured to operate in accordance with a customer policy 815. An exemplary customer policy might instruct the honey pot to watch for certain types and/or formats of emails, including, for instance, to search for certain keywords, allowing for customization on a customer-by-customer basis. In addition, the honey pot 810 may utilize extended monitoring options 820, including monitoring for other conditions, such as monitoring a customer's web site for compromises, etc. The honey pot 810, upon receiving a message, optionally can convert the email message into a data file.

In some embodiments, the honey pot 810 will be in communication with one or more correlation engines 825, which can perform a more detailed analysis of the email messages (and/or other information/data, such as information received from crawling/monitoring operations) received by the honey pot 810. In a particular aspect, for example, a correlation engine 825 can implement (and/or have access to) a graphics recognition, such as that described above, for analyzing images. (It should be noted, however, that the assignment of functions herein to various components, such as honey pots 810, correlation engines 825, etc. is arbitrary, and in accordance with some embodiments, certain components may embody the functionality ascribed to other components.)

On a periodic basis and/or as incoming messages/information are received/retrieved by the honey pot 810, the honey pot 810 will transmit the received/retrieved email messages (and/or corresponding data files) to an available correlation engine 825 for analysis. Alternatively, each correlation engine 825 may be configured to periodically retrieve messages/data files from the honey pot 810 (e.g., using a scheduled FTP process, etc.). For example, in certain implementations, the honey pot 810 may store email messages and/or other data (which may or may not be categorized/filtered), as described above, and each correlation engine may retrieve data an/or messages on a periodic and/or ad hoc basis. For instance, when a correlation engine 825 has available processing capacity (e.g., it has finished processing any data/messages in its queue), it might download the next one hundred messages, data files, etc. from the honeypot 810 for processing. In accordance with certain embodiments, various correlation engines (e.g., 825a, 825b, 825c, 825d) may be specifically configured to process certain types of data (e.g., domain registrations, email, etc.). In other embodiments, all correlation engines 825 may be configured to process any available data, and/or the plurality of correlation engines (e.g., 825a, 825b, 825c, 825d) can be implemented to take advantage of the enhanced efficiency of parallel processing.

The correlation engine(s) 825 can analyze the data (including, merely by way of example, email messages) to determine whether any of the messages received by the honey pot 810 are phish messages and/or are likely to evidence a fraudulent attempt to collect personal information. In particular, the correlation engine(s) 825 can analyze any images provided with the data in accordance with methods of the invention.

The correlation engine 825 can be in communication an event manager 835, which may also be in communication with a monitoring center 830. (Alternatively, the correlation engine 825 may also be in direct communication with the monitoring center 830.) In particular embodiments, the event manager 835 may be a computer and/or software application, which can be accessible by a technician in the monitoring center 830. If the correlation engine 825 determines that a particular incoming email message is a likely candidate for fraudulent activity or that information obtained through crawling/monitoring operations may indicate fraudulent activity, the correlation engine 825 can signal to the event manager 835 that an event should be created for the email message. In particular embodiments, the correlation engine 825 and/or event manager 835 can be configured to communicate using the Simple Network Management ("SNMP") protocol well known in the art, and the correlation engine's signal can comprise an SNMP "trap" indicating that analyzed message(s) and/or data have indicated a possible fraudulent event that should be investigated further. In response to the signal (e.g., SNMP trap), the event manager 835 can create an event (which may comprise an SNMP event or may be of a proprietary format).

Upon the creation of an event, the event manager 835 can commence an intelligence gathering operation (investigation) 840 of the message/information and/or any URLs included in and/or associated with message/information. As described in detail below, the investigation can include gathering information about the domain and/or IP address associated with the URLs, as well as interrogating the server(s) hosting the resources (e.g., web page, etc.) referenced by the URLs. (As used herein, the term "server" is sometimes used, as the context indicates, any computer system that is capable of offering IP-based services or conducting online transactions in which personal information may be exchanged, and specifically a computer system that may be engaged in the fraudulent collection of personal information, such as by serving web pages that request personal information. The most common example of such a server, therefore, is a web server that operates using the hypertext transfer protocol ("HTTP") and/or any of several related services, although in some cases, servers may provide other services, such as database services, etc.). In certain embodiments, if a single email message (or information file) includes multiple URLs, a separate event may be created for each URL; in other cases, a single event may cover all of the URLs in a particular message. If the message and/or investigation indicates that the event relates to a particular customer, the event may be associated with that customer.

The event manager can also prepare an automated report 845 (and/or cause another process, such as a reporting module (not shown) to generate a report), which may be analyzed by an additional technician at the monitoring center 830 (or any other location, for that matter), for the event; the report can include a summary of the investigation and/or any information obtained by the investigation. In some embodiments, the process may be completely automated, so that no human analysis is necessary. If desired (and perhaps as indicated by the customer policy 815), the event manager 835 can automatically create a customer notification 850 informing the affected customer of the event. The customer notification 850 can comprise some (or all) of the information from the report 845. Alternatively, the customer notification 850 can merely notify the customer of an event (e.g., via email, telephone, pager, etc.) allowing a customer to access a copy of the report (e.g., via a web browser, client application, etc.). Customers may also view events of interest to the using a portal, such as a dedicated web site that shows events involving that customer (e.g., where the event involves a fraud using the customer's trademarks, products, business identity, etc.).

If the inventigation 840 reveals that the server referenced by the URL is involved in a fraudulent attempt to collect personal information, the technician may initiate an interdiction response 855 (also referred to herein as a "technical response"). (Alternatively, the event manager 835 could be configured to initiate a response automatically without intervention by the technician). Depending on the circumstances and the embodiment, a variety of responses could be appropriate. For instance, those skilled in the art will recognize that in some cases, a server can be compromised (i.e., "hacked"), in which case the server is executing applications and/or providing services not under the control of the operator of the server. (As used in this context, the term "operator" means an entity that owns, maintains and/or otherwise is responsible for the server.) If the investigation 840 reveals that the server appears to be compromised, such that the operator of the server is merely an unwitting victim and not a participant in the fraudulent scheme, the appropriate response could simply comprise informing the operator of the server that the server has been compromised, and perhaps explaining how to repair any vulnerabilities that allowed the compromise.

In other cases, other responses may be more appropriate. Such responses can be classified generally as either administrative 860 or technical 865 in nature, as described more fully below. In some cases, the system 800 may include a dilution engine (not shown), which can be used to undertake technical responses, as described more fully below. In some embodiments, the dilution engine may be a software application running on a computer and configured, inter alia, to create and/or format responses to a phishing scam, in accordance with methods of the invention. The dilution engine may reside on the same computer as (and/or be incorporated in) a correlation engine 825, event manager 835, etc. and/or may reside on a separate computer, which may be in communication with any of these components.

As described above, in some embodiments, the system 800 may incorporate a feedback process, to facilitate a determination of which planting locations/techniques are relatively more effective at generating spam. Merely by way of example, the system 800 can include an address planter 870, which may provide a mechanism for tracking information about planted addresses, as described above. Correspondingly, the event manager 835 may be configured to analyze an email message (and particular, a message resulting in an event) to determine if the message resulted from a planting operation. For instance, the addressees of the message may be evaluated to determine which, if any, correspond to one or more address(es) planted by the system 800. If it is determined that the message does correspond to one or more planted addresses, a database of planted addresses may be consulted to determine the circumstances of the planting, and the system 800 might display this information for a technician. In this way, a technician could choose to plant additional addresses in fruitful locations. Alternatively, the system 800 could be configured to provide automatic feedback to the address planter 870, which in turn could be configured to automatically plant additional addresses in such locations.

In accordance with various embodiments of the invention, therefore, a set of data about a possible online fraud (which may be an email message, domain registration, URL, and/or any other relevant data about an online fraud, including images contained in various web pages, email messages and/or the like) may be received and analyzed to determine the existence of a fraudulent activity, an example of which may be a phishing scheme. If so, any relevant email message, URL, web site, etc. may be investigated, and/or responsive action may be taken.

Figure 9:
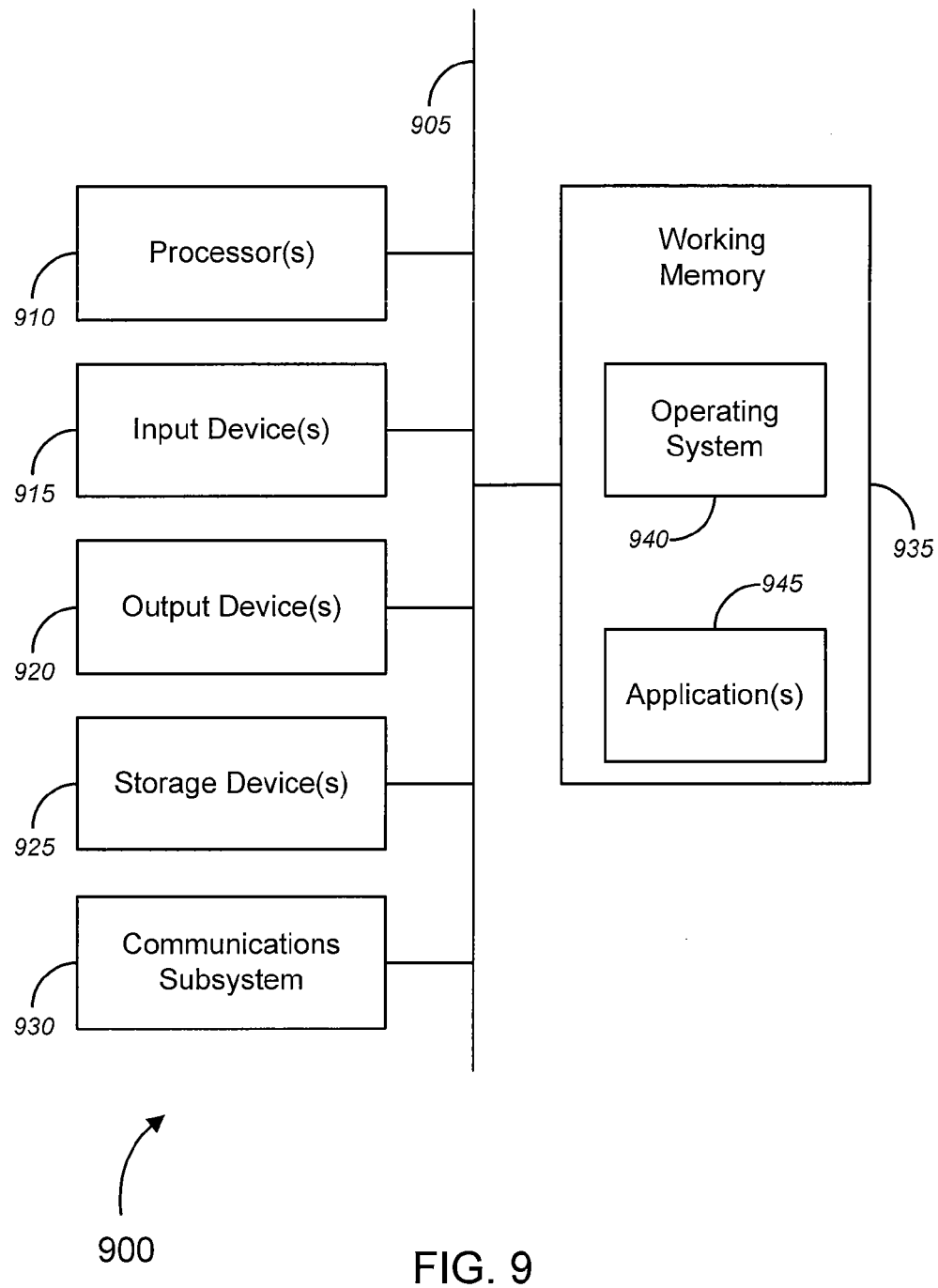
FIG. 9 is a generalized block diagram of a computer system that can be used in accordance with various embodiments of the invention.

FIG. 9 provides a schematic illustration of one embodiment of a computer system 900 that can perform the methods of the invention and/or can implement a graphics recognition engine, as described herein, as well as function as any of the computers or computing devices described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. The computer system 900 is shown comprising hardware elements that can electrically coupled via a bus 905 (or may otherwise be in communication, as appropriate). The hardware elements can include one or more processors 910, including without limitation one or more general-purpose processors and/or one or more special-purpose processors (such as digital signal processing chips, graphics acceleration chips, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 9 might also include a communications subsystem 930; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 930 may permit data to be exchanged with a network (such as the network 1010 described below, and/or any other devices described herein. In many embodiments, the computer system 900 will further comprise a memory 935, which can include a RAM or ROM device, as described above.

The computer system 900 also can comprise software elements, shown as being currently located within the working memory 935, including an operating system 940 and/or other code 945, such as one or more application programs, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 925 described above. In some cases, the storage medium might be incorporated within a computer system, such that the instructions, when executed by the computer system, perform the procedures of the method(s). In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 10:
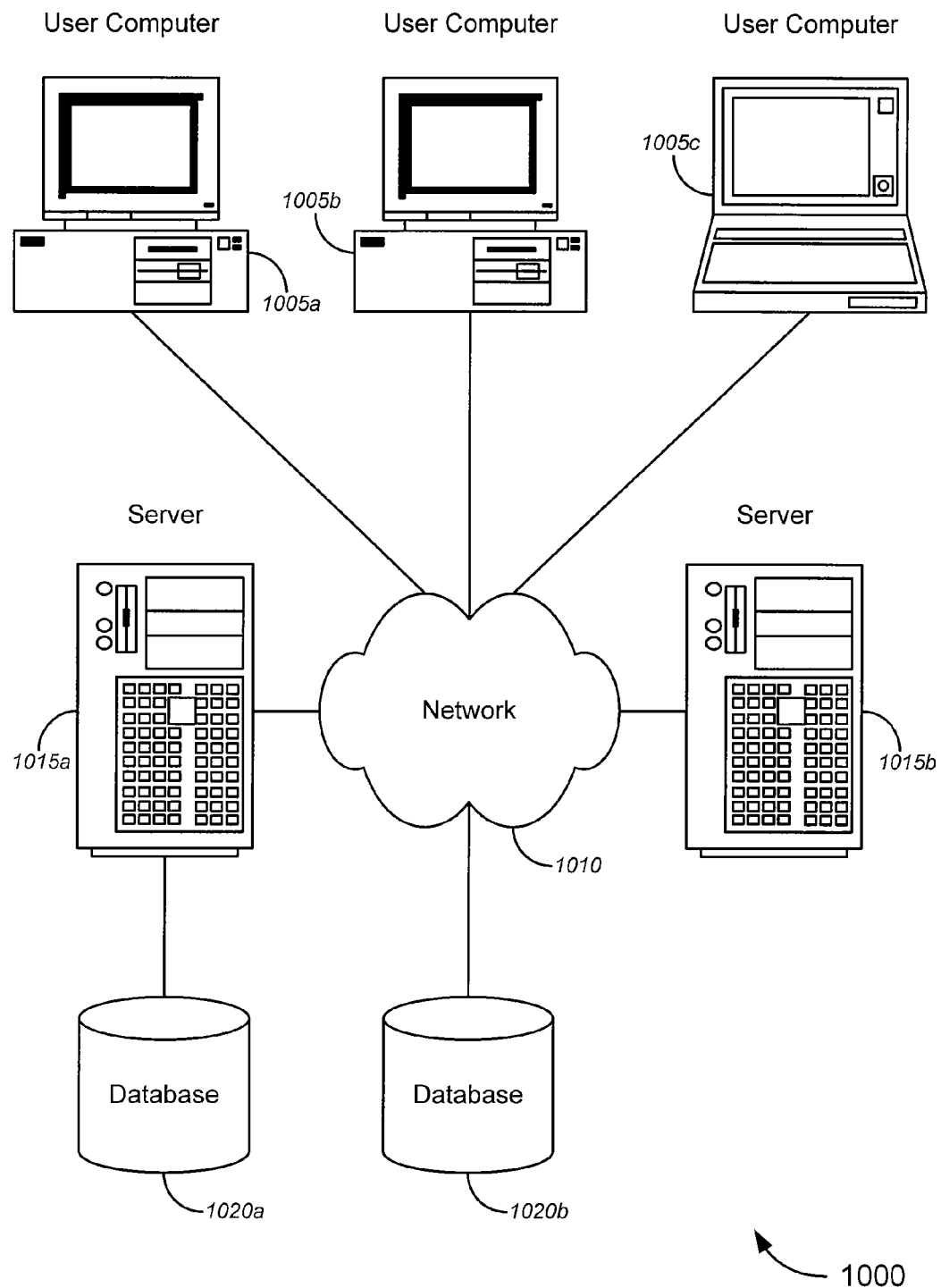
FIG. 10 is a generalized block diagram of a networked computer system that can be used in accordance with various embodiments of the invention.

A set of embodiments comprises systems for analyzing images, including the analysis of images in various contexts (such as in detecting online fraud, evaluating web sites and/or email messages, and the like). Merely by way of example, FIG. 10 illustrates a schematic diagram of a system 1000 that can be used in accordance with one set of embodiments. The system 1000 can include one or more user computers 1005. The user computers 1005 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1005 can also have any of a variety of applications, including one or more applications configured to perform methods of the invention, as well as one or more office applications, database client and/or server applications, and web browser applications. Alternatively, the user computers 1005 can be any other electronic device, such as a thin-client computer, Internet-enabled mobile telephone, and/or personal digital assistant, capable of communicating via a network (e.g., the network 1010 described below) and/or displaying and navigating web pages or other types of electronic documents. Although the exemplary system 1000 is shown with three user computers, any number of user computers can be supported.

Certain embodiments of the invention operate in a networked environment, which can include a network 1010. The network 1010 can be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1015. Each of the server computers 1015 may be configured with an operating system including without limitation any of those discussed above, as well as any commercially-available server operating systems. Each of the servers 1015 may also be running one or more applications, which can be configured to provide services to one or more clients 1005 and/or other servers 1015.

Merely by way of example, one of the servers 1015 may be a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one ore more file and/or application servers, which can include one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including without limitation web applications (which might, in some cases, be configured to perform methods of the invention). Merely by way of example, a web application can be implemented as one or more scripts or programs written in any programming language, such as Java™, C#™, or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from database clients running on a user computer 1005 and/or another server 1015. In some embodiments, an application server can create web pages dynamically for displaying the information in accordance with embodiments of the invention, such as providing output from image analysis operations, for monitoring anti-fraud operations and/or the like. Data provided by an application server may be formatted as web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server.

In accordance with further embodiments, one or more servers 1015 can function as a file server and/or can include one or more of the files necessary to implement methods of the invention incorporated by an application running on a user computer 1005 and/or another server 1015. Alternatively, as those skilled in the art will appreciate, a file server can include all necessary files, allowing such an application to be invoked remotely by a user computer 1005 and/or server 1015. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1015a (and/or a user computer 1005). Alternatively and/or additionally, a database 1020b can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, a database 1020 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or storage management software.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer system for analyzing an image, the system comprising:
    a database configured to store of image templates for a plurality of elements of interest, each of the image templates comprising a candidate fingerprint, each candidate fingerprint comprising a plurality of candidate fingerprint signals;
    a processor in communication with the database; and
    a computer readable medium having embodied thereon a software program executable by the processor, the software program comprising:
    a) an image preprocessing and segmentation component configured to receive a suspect image and identify, within the suspect image, a suspect blob having an associated set of suspect blob boundaries;
    b) a fingerprint generation component configured to create a suspect fingerprint, based at least in part on the suspected blob boundaries, the suspect blob fingerprint comprising a set of suspect blob fingerprint signals; and
    c) a fingerprint matching component configured to calculate a similarity score for an element of interest, the similarity score being based on a plurality of similarity measures between the suspect fingerprint and a candidate fingerprint for the element of interest, each of the similarity measures being calculated based on a suspect fingerprint signal and a respective candidate fingerprint signal, and to determine, based at least in part on the similarity score, determine whether the suspect image is a likely match for the element of interest.

2. A computer system as recited in claim 1, wherein the fingerprint matching component is configured to calculate similarity scores for a plurality of elements of interest, and based on the respective similarity scores, determine which of the elements of interest is a best match for the suspect image.

3. A computer system as recited in claim 1, wherein the fingerprint matching component is configured to calculate a plurality of similarity scores, the plurality of similarity scores comprising:
    a composite similarity score based on a weighted composite of the plurality of similarity measures; and
    a minimum individual similarity score based on a minimum value from among the plurality of similarity measures.

4. A computer system as recited in claim 3, wherein the determining whether the suspect image is a likely match comprises:
    comparing the composite similarity score with a first threshold having a first value; and
    comparing the minimum individual similarity score with a second threshold having a second value.

5. A computer system as recited in claim 4, wherein the first value and the second value are the same value.

* * * * *